Oct. 16, 1962
C. A. GRANT ET AL
3,058,416
BOOK CHARGING MACHINE OR THE LIKE FOR
LIBRARY AND OTHER USES
Filed June 28, 1960
5 Sheets-Sheet 3
FIG. 6.
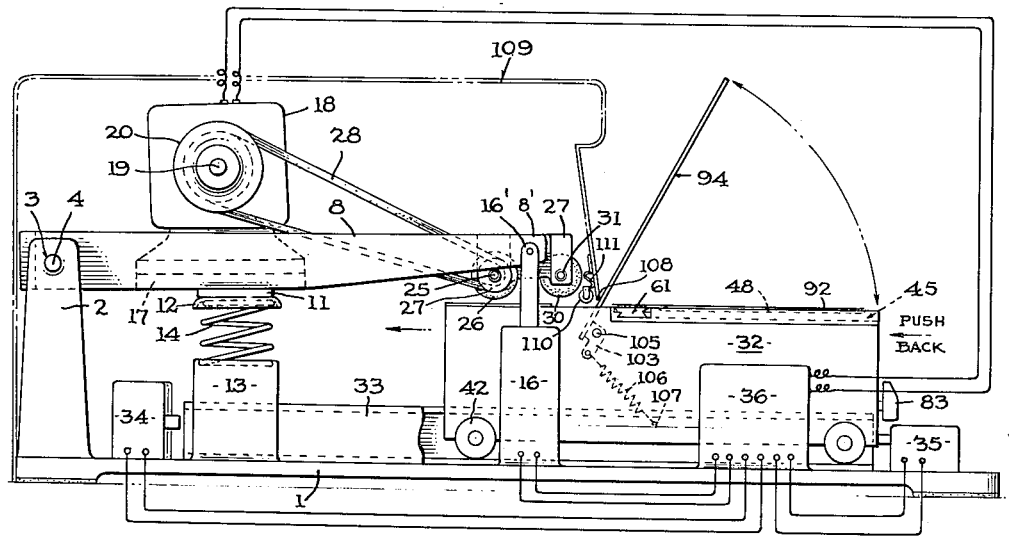
FIG. 7.
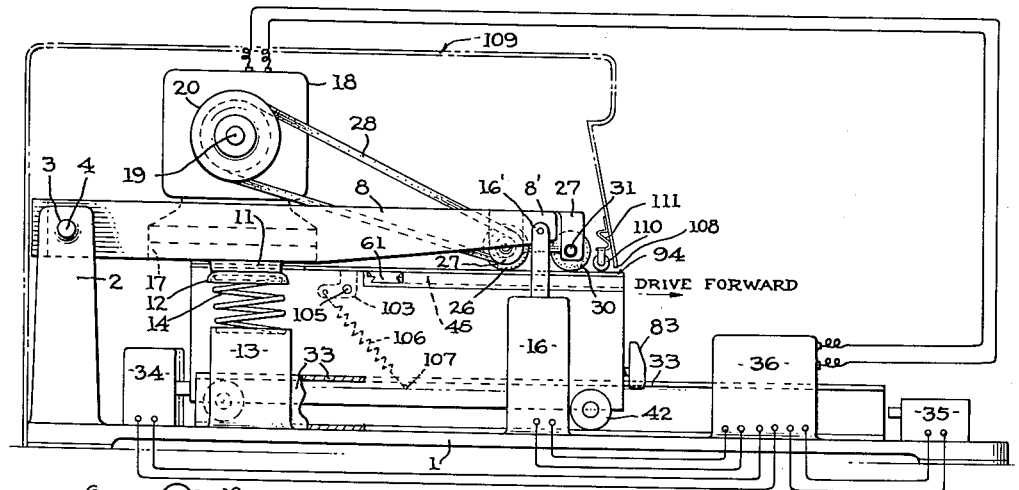
FIG. 8.
*INVENTORS*
CHESTER A. GRANT
ALLEN H. STRAND
BY *Robb & Robb*
ATTORNEYS

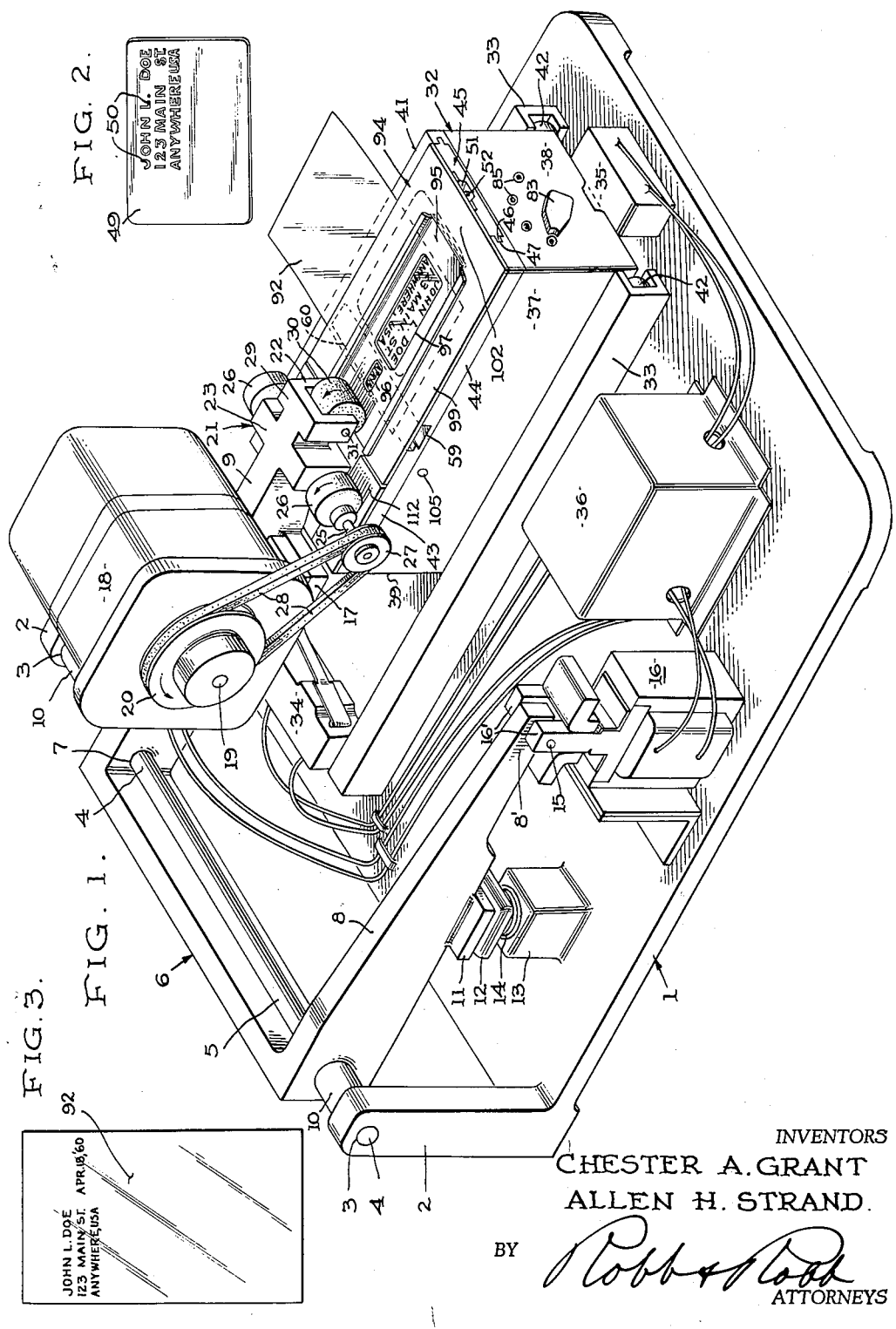

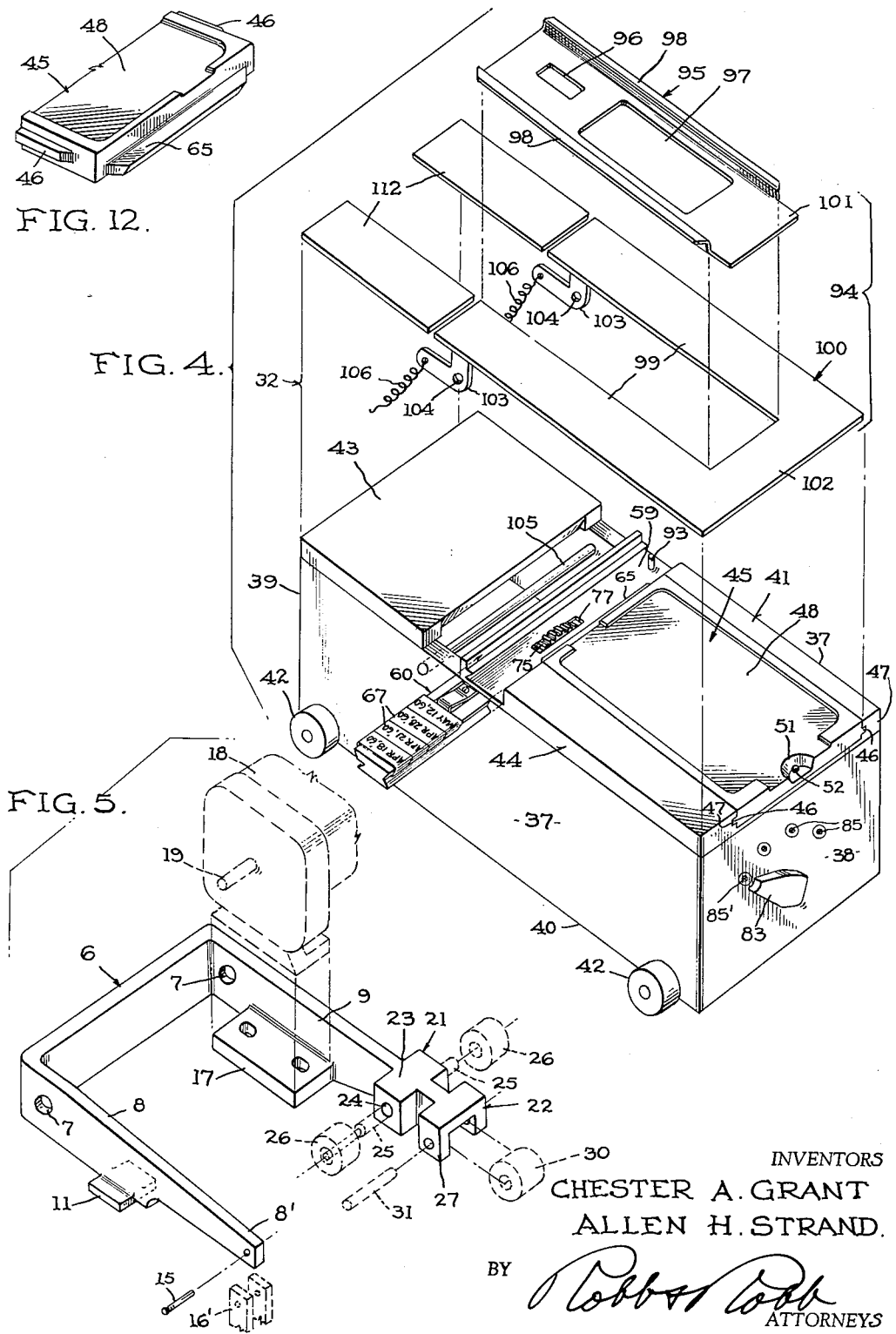

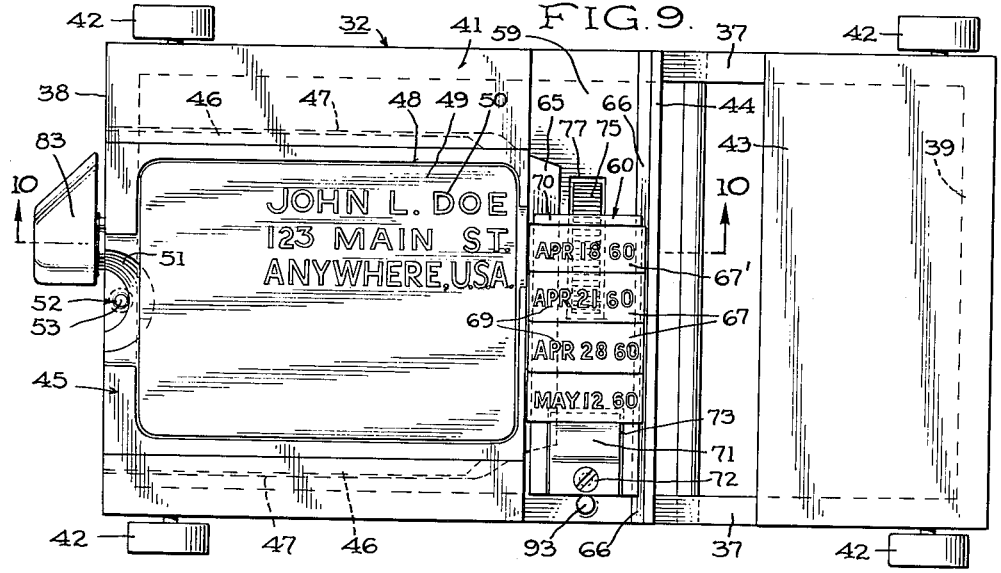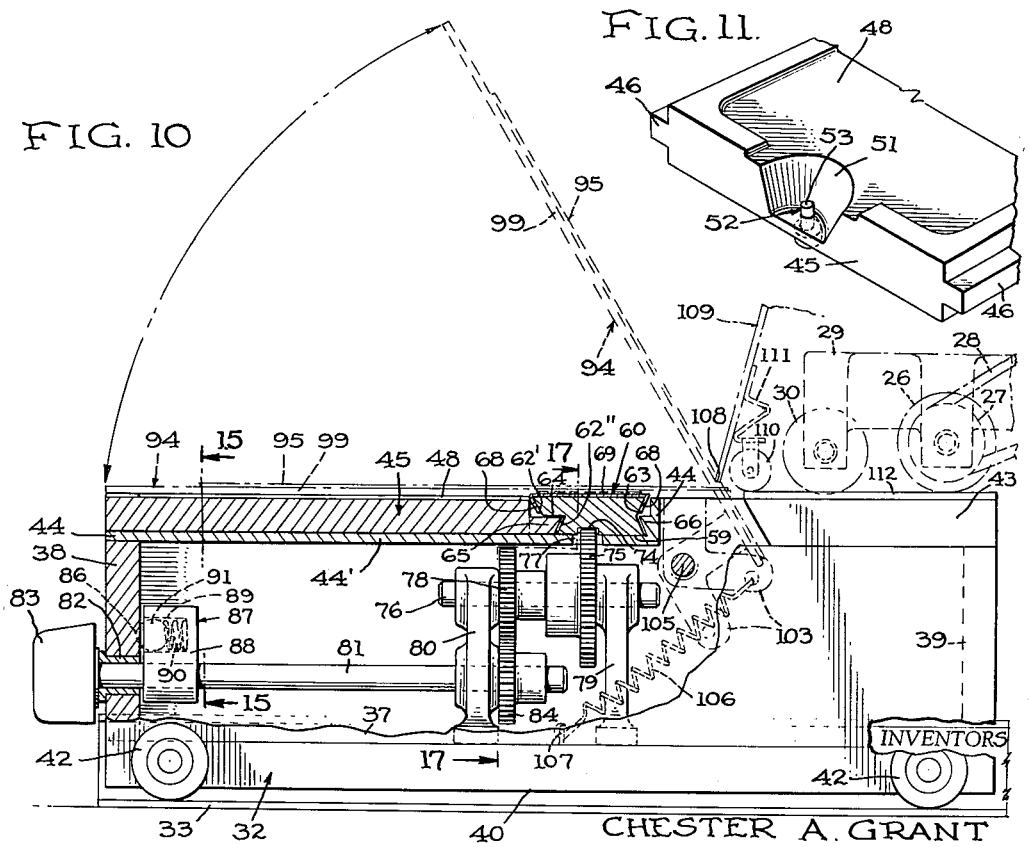

FIG. 13.
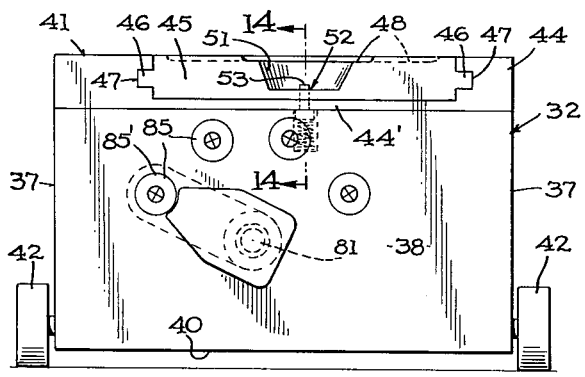
FIG. 14.
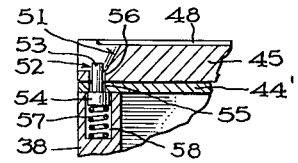
FIG. 16.
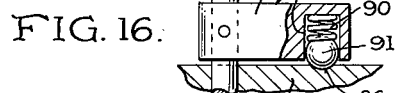
FIG. 15.
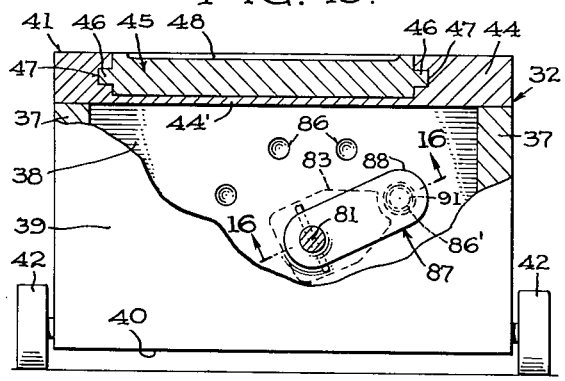
FIG. 18.
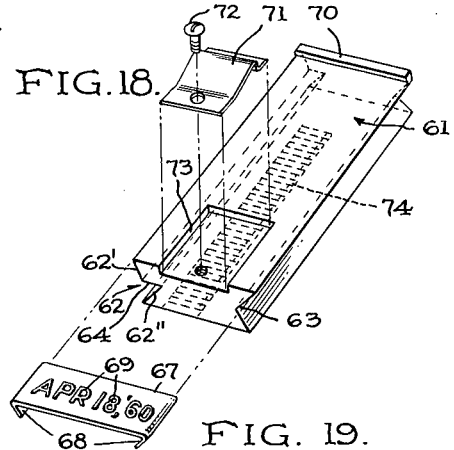
FIG. 17.
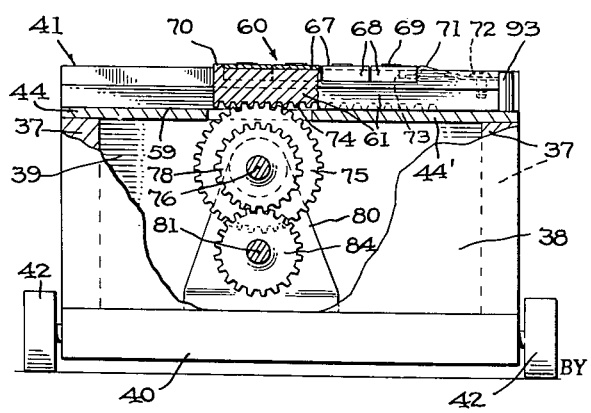
FIG. 19.
INVENTORS
CHESTER A. GRANT
ALLEN H. STRAND
BY
*Robb & Robb*
ATTORNEYS United States Patent Office 3,058,416
Patented Oct. 16, 1962

3,058,416
BOOK CHARGING MACHINE OR THE LIKE FOR LIBRARY AND OTHER USES
Chester A. Grant and Allen H. Strand, Syracuse, N.Y., assignors to Gaylord Bros., Inc., Syracuse, N.Y., a corporation of New York
Filed June 28, 1960, Ser. No. 39,296
18 Claims. (Cl. 101—269)

This invention relates to a portable printing machine of the class which uses small portable printing die plates over which are placed charge slips of paper or light-weight cards upon which the desired record data is printed responsive to the imprinting action of a rotary ink-impregnated pressure roller.

More particularly, this invention relates to portable printing machines of the type which are adapted to quickly record transactions of various kinds upon paper recording elements in the form of slips or cards which are placed upon small embossed or other printing die plates which have come to be known popularly as "shopping" or "charge" identification plates or cards, responsive to movement of the superimposed record or charge slip and "charge" identification die plate beneath an ink-impregnated pressure roller platen.

Specifically, the invention relates to a portable electrically powered printing machine of the above-mentioned type which is adapted to be used more particularly in public or other circulating libraries and other places where books or other articles are temporarily loaned out to borrowers with restrictions as to the time of returning.

One primary object of the invention is to provide a mechanical library book charging machine having electrically powered means for effecting the recordation upon the "borrower's" and/or "librarian's" card of the necessary data for fully identifying in clean-cut type by means of automatic and uniform printing of the borrower's full name and address, as well as recording the date of loan and/or return of the borrowed article.

Another primary object of this invention is to provide an electrically operated device of the aforementioned type which prints the borrower's name, address and pertinent borrowing dates upon a library charge-out card or slip by means of a reciprocable carriage which carries the charge-out slip to be printed upon, together with an underlying embossed printing plate or other die member cooperatively related to an ink-impregnated roller or platen.

Still another object is to provide a library book charging machine of this type which is a marked advancement over prior library card printing or charging machines of the "impact" printing type. In the "impact" type machines, only a limited and usually abbreviated number of printing characters can be successfully used in order to attain an effective and clear printed identification of the borrower and the dates of the transaction, whereas machines according to the present invention are not so limited in achieving clear printing action.

A further object is to provide a library book charging machine of this class which includes electrical circuitry for effecting simultaneous positioning of an ink-impregnated pressure roller and the starting of the electrically powered driving means, in combination with related electrical circuitry for simultaneously de-activating the power driving means and for effecting release of the ink-impregnated roller from its printing position at the completion of the printing operation.

Other and further objects and advantages of the invention will become apparent from the following detailed description, taken in conjunction with the accompanying drawings, and the novel features thereof will be defined in the appended claims.

In the drawings:

FIG. 1 is a perspective view illustrating one practical form of this invention and showing the charging machine nearly at the completion of a printing run;

FIG. 2 is a detail view of an embossed identification plate or printing die card;

FIG. 3 is a detail plan view of a library "charge-out" slip showing the borrower's name and date of the transaction as printed thereon by the machine of FIG. 1;

FIG. 4 is an exploded perspective view of the carriage assembly component of the machine;

FIG. 5 is an exploded perspective view on a reduced scale of the printing head supporting frame component upon which the drive motor, drive wheels and inking roller are carried, and with the latter components shown in broken outline;

FIG. 6 is a side elevational view of the machine assembly, with the carriage in the "forward" position and with the drive and ink rollers in the "raised" non-driving and non-inking positions, respectively, and also showing the electrical power circuits which have been diagrammatically illustrated in conjunction with the other components;

FIG. 7 is a side elevational view similar to FIG. 6 but showing the carriage in its rearward or "ready" position and with the drive and ink rollers in their "lowered" driving and inking positions, respectively;

FIG. 8 is a small schematic wiring diagram of the electrical circuitry of this invention;

FIG. 9 is an enlarged top plan view of the carriage assembly, with the hold-down guard and drive wheel trackway omitted for clarity;

FIG. 10 is a side elevational view of the carriage assembly of FIG. 9, with a portion thereof shown in cross-section as seen substantially on line 10—10 of FIG. 9, and also showing the hold-down guard and trackway in its "closed" and "open" positions as depicted by broken lines;

FIG. 11 is a fragmentary perspective view as seen from the front end of the removable card tray component of the carriage assembly;

FIG. 12 is a fragmentary perspective view on a somewhat reduced scale from that of FIG. 11, of the card tray component as seen from the back thereof;

FIG. 13 is a front end elevational view of the carriage assembly of FIG. 9, but shown on a somewhat reduced scale from that of FIGS. 9 and 10;

FIG. 14 is a fragmentary cross-sectional detail view through the lock means of the card tray as seen on line 14—14 of FIG. 13;

FIG. 15 is a view partially in elevation and partially in cross-section of the carriage showing the date bar indexing means details as seen substantially on line 15—15 of FIG. 10;

FIG. 16 is a further fragmentary detail view of the date bar indexing means as seen substantially on line 16—16 of FIG. 15;

FIG. 17 is a view partially in elevation and partially in cross-section as seen substantially on line 17—17 of FIG. 10, showing the date bar actuating means;

FIG. 18 is an exploded perspective detail view of the date bar component; and

FIG. 19 is a perspective detail view of a date printing plate which fits on and is supported by the date bar.

Like reference characters designate corresponding parts throughout the several figures of the drawings.

As illustrated, the printing machine comprises a generally flat rectangular supporting base member 1 (best seen in FIG. 1) of any suitable construction adapted to receive and support the various component mechanisms hereinafter described. The base member 1 is provided with a pair of laterally spaced upstanding arms 2, 2, each having an aperture 3 preferably povided in the uppermost end thereof in which to support the ends 4, 4 of a transverse shaft 5. The shaft 5 serves to pivotally mount a printing head which includes a U-shaped frame or yoke designated generally at 6 and having bearing apertures 7, 7 provided in the base end of tapered arms 8 and 9 respectively. A pair of tubular spacers 10, 10 may be disposed near the ends of shaft 5 outwardly adjacent the base end of the U-frame 6 and inwardly adjacent the respective support arms 2, 2, to center the U-frame 6 between said latter arms. The U-frame 6 of the printing head is mounted so that its arms 8 and 9 are disposed substantially horizontally and project toward the front end of the base member 1. Arm 8 of U-frame 6 is provided with a laterally extended flange 11 approximately midway of its length, and is used to mount a spring retainer cup 12 therebeneath. A spring seating boss 13 is provided on base member 1 in alignment with flange 11 and cup 12 but spaced vertically therebelow, and between which a preferably coiled expansion-type spring 14 is disposed for holding said U-frame in a predetermined "raised" position. The outer and free end 8' of arm 8 is provided with any suitable means 15 for pivotally connecting the same to the upper end of an armature 16' of a solenoid 16 which is suitably fixedly mounted on the base member 1.

The other arm 9 of U-frame 6 is also provided with a laterally inwardly offset mounting flange 17 upon which a fractional horsepower electric motor 18 is preferably adjustably mounted in a conventional manner. Motor 18 serves to give substantial weight to the printing head and is provided with the usual stub drive shaft 19 upon which a pulley 20 or other appropriate driving means is suitably secured. Further out near the end of arm 9, there are provided suitable drive roller and ink-roller mounting means 21 and 22, respectively. Said means 21 as shown comprises an enlarged boss 23 provided on arm 9 and having a bore 24 extending laterally therethrough in which a roller supporting shaft 25 is disposed, said shaft projecting outwardly beyond each side of said boss 23 for the mounting thereon of a pair of drive wheels or rollers 26, 26. Shaft 25 is extended inwardly beyond the innermost roller 26 to provide for mounting a smaller drive pulley 27 or other appropriate power transmitting means in longitudinal alignment with the larger drive pulley 20. A conventional drive belt 28 or other suitable power linkage inter-connects members 20 and 27 and serves to impart rotary driving motion to the wheels 26, 26.

The ink roller mounting means 22 of the printing head as shown comprises an inverted U-shape bracket or yoke 29 on the free end of arm 9 within which an ink impression or pressure roller 30, which is preferably of the ink-impregnated type, is freely rotatably mounted upon a journaled shaft 31.

Located beneath arm 9 of the printing head and beneath the drive wheels 26, 26 and the ink pressure roller 30, there is provided a carriage assembly 32 which is reciprocably mounted in a pair of channel shaped trackways 33, 33 on the base member 1. The trackways 33, 33 are longitudinally fixed to the base member 1 in spaced parallel relation, so that the carriage assembly 32 can be manually and automatically reciprocated therein between a fixed pair of travel limiting microswitches 34 and 35, at the back and front, respectively, which operate through a base mounted relay 36 to first simultaneously activate the motor 18 and solenoid 16 and then, secondly, to simultaneously deactivate the same at the completion of the printing run. Microswitches 34 and 35 are biased in normally open and normally closed positions, respectively, so that switch 34 will be only momentarily closed by engagement of the carriage at the end of its rearward travel. Said momentary closing of the switch 34 energizes the relay which maintains the power operations aforesaid until the other switch 35 is opened by the carriage at the limit of its forward travel.

The carriage assembly 32 which carries the printing die plates or cards and the data recording elements in the form of cards or slips, comprises a rectangular box-like structure having side walls 37, 37, front and back walls 38 and 39 respectively, and bottom and top walls 40 and 41 respectively. Wheels 42 are mounted in any conventional manner at the lower corners of said carriage for complementary rolling action within trackways 33, 33. The top wall designated 41 of the carriage assembly 32 further includes a separate back cover section 43 and a separate front sub-assembly cover 44. The front sub-assembly cover 44, in turn, includes a removable printing plate or card tray 45 which is slidingly supported at the bottom thereof by cover 44 as best seen at 44' in FIG. 10, and is provided with a pair of laterally extended winged guides 46, 46 along the opposed longitudinal edges thereof. The guides 46, 46 cooperatively engage in spaced complementary trackways 47, 47 formed in the front top cover 44. The upper surface of tray 45 is generally flush with the upper surface of cover 44 but is provided with a shallow recessed area 48 substantially corresponding in size to and for reciving a generally rectangular personal identification printing plate or card 49 preferably having a borrower's full name and address provided thereon in embossed printing characters 50 (see FIG. 2). Provided in an arcuate recess 51 in the front edge of tray 45 is a tray positioning locking mechanism 52 (best seen in FIG. 14) which includes a depressible cylindrical button 53 having an enlarged base 54. The cylindrical part of button 53 is disposed so that it projects up through clearance holes 55 and 56 in the front cover 44 of the top wall 41 and in the front part of tray 45, respectively, responsive to a small expansion spring 57 disposed within a recess 58 in the front wall 38. In order to remove tray 45, it is only necessary to depress the button 53 below the bottom surface of the tray 45 and then manually slide said tray forward.

Within the front top cover section 44 of the carriage assembly 32, there is also provided forwardly adjacent the backmost edge thereof and rearwardly adjacent the recessed surface area 48 of the card tray 45, a laterally extended recessed trackway or channel 59 within which a date bar mechanism 60 is reciprocably and adjustably disposed (see FIGS. 4, 9, 10 and 17). The date bar mechanism 60 comprises an elongated generally rectangular (in top plan view) date bar 61 having inwardly V-grooved longitudinal side edges 62 and 63, (see FIGS. 10 and 18). Grooved edge 62 has its inclined surfaces 62' and 62" slightly laterally offset from each other, thereby defining a short plane surface 64 parallel with the top and bottom surfaces of date bar 61 and which together with beveled surface 62" cooperatively engage and interlock with a complementally formed guide support 65 provided on the back edge of card tray 45 (see FIGS. 9, 10 and 12). The other grooved edge 63 cooperatively engages and slidingly interlocks with a complementally formed guide support or shoulder 66 which extends along the length of the back wall of trackway or channel 59 above.

Adapted to slidingly fit over the date bar 61 are a plurality of individual date printing plates 67 having short inwardly inclined side tabs 68, 68 which cooperatively engage in the grooved edges 62 and 63 of the date bar 61. Date printing characters 69 may be embossed or otherwise suitably formed on the date plates 67 (best seen in FIGS. 9, 10 and 19) and when the latter are in assembled relation, the printing characters thereof are on the same horizontal plane as the printing die characters 50 on the identification card 49 when it is positioned within the shallow recess 48 in the card tray 45. The date plates 67 are slid on from one end of date bar 61 up against a slightly raised stop shoulder 70 formed on the opposite end of the date bar, passing over a depressible leaf spring 71 secured by a screw 72 in a recess 73 which is formed in the first-mentioned end of the date bar 61 (best seen in FIGS. 17, 18 and 19).

Means are provided for positioning or indexing one of the date printing plates on the date bar beside the borrower's name and address on the identification plate prior to the printing operation which will now be described. The lower reverse surface of the date bar 61 is provided with a toothed rack 74 which is adapted to be engaged by a pinion gear 75 which is mounted upon a rotary intermediate control shaft 76 (see FIG. 10), the periphery of said pinion gear 5 projecting up through a clearance opening 77 in the trackway or channel 59 of cover piece 44. The rotary shaft 76 also has a spur gear 78 mounted thereon adjacent to the pinion gear 75, said shaft 76 being suitably journaled inside of the carriage box structure as by spaced journal blocks or bearing supports 79 and 80. Block 80 also supports one end of another rotary control shaft 81 in spaced relationship to shaft 76, with the other end of shaft 81 being journaled in a sleeve bearing insert 82 provided in the front wall 38 of carriage assembly 32, said shaft projecting outwardly of wall 38 to receive thereon a fixed indexing control knob 83. The inner end of shaft 81 carries a complementary spur gear 84 which meshes with spur gear 78 and serves to impart rotary motion to gear 75 responsive to manual rotation of control shaft 81 by the knob 83. To assure proper alignment of the desired type plate 67 opposite the borrower's name and address, there is provided a plurality of arcuately spaced indexing indicia 85 on the outer face of the front carriage wall 38 corresponding to the number of date plates carried on the date bar. There are also a plurality of correspondingly arcuately spaced indexing detent receiving indentations 86 aligned with and positioned behind the indicia 85 in the inner face of carriage wall 38, and a detent means generally designated 87 is fixedly positioned on shaft 81 so that it and the control knob 83 are simultaneously aligned or indexed on the same corresponding index points. Both parts 83 and 87 are further related in a predetermined manner to the date bar 61 and date plates 67 through the various aforementioned gears so that when the control knob 83 and detent means 87 are indexed to their respective first indexing positions 85' and 86' respectively, the first or outermost date plate 67' is indexed in proper alignment with the borrower's name and address on the identification card 49.

The detent means 87 includes a stop or indexing block 88 having a recess 89 in one end thereof in which there is positioned a compression spring 90 behind a detent ball 91 (best seen in FIG. 16). As the control knob 83 turns to the different index points, the detent ball 91 yieldably seats in the respective indentations 86 and temporarily locks therein to hold the date bar 61 and the desired date plate 67 firmly in position while the charge-out printing is being made onto the charge-out slip or library data recording slip 92 (shown in FIGS. 1 and 3), responsive to movement of the carriage beneath the ink-impregnated pressure roller 30, as will be described in more detail hereinafter.

From the foregoing description of the date bar and indexing mechanism, the date bar set-up procedure should be apparent but will now be reviewed as follows. The desired group of date plates 67 are first attached to the date bar 61. Then the card tray 45 is partially slid forward by releasing the locking mechanism 52, so that better access to the date bar channel or trackway 59 is attained by the withdrawal therefrom of one of the date bar guides 65 which is attached to the back of tray 45. The control knob 83 is then set to the first indexing position 85', and the date bar is set or inserted into the trackway 59 all the way back against a stop pin 93 provided at one end of said trackway (better seen in FIGS. 9 and 17). The card tray 45 is then slid back into closed position whereby the guide support 65 locks the date bar slidably in position against the opposite angled guide support or shoulder 66 and with one end of the toothed rack 74 complementally enmeshed with the teeth of pinion gear 75 therebelow. The date bar can then be properly indexed by setting the control knob on one of the four designated index points 85, and the desired date bar is reciprocably moved to the desired position responsive to rotation of the control knob 83 and shaft 81, motion being transmitted to the date bar 61 through the spur gears 84 and 78 and the rack and pinion 74 and 75.

The carriage assembly 32 further includes on the top part thereof a pivotally mounted ink roller guard and identification and charge-out slip hold-down assembly designated generally at 94 (and better seen in FIGS. 1, 4 and 10). Said assembly 94 includes an elongated removable ink roller guard plate 95 which, when in assembled relationship, allows the ink-impregnated roller 30 to roll only over the printing or embossed areas of the date plates and identification card to effect the printing transformation of the desired data onto the superimposed charge-out slip or card 92 while guarding the rest of said slip or card 92 against ink smears. For this purpose, guard plate 95 is provided with cut out areas 96 and 97 for registry over the embossed characters of the date plate 67 and identification card 49 respectively. The guard plate 95 further is provided with laterally extended and slightly raised supporting wings 98, 98 along opposite longitudinal edges thereof which are used to support the said plate 95 between a pair of spaced hold-down rails 99, 99 on a flat U-shaped roller guard holder 100. The wings 98, 98 of guard plate 95 stop short of the front end of said plate, with said plate continuing beyond said wings to define a tongue-like member 101 which fits beneath the front rail-joining or rail-connecting piece 102, when the said guard plate 95 is assembled on said guard holder 100. At the free end of the rails 98, 98 and to the underside of each one there is attached an L-shaped bracket 103 having an aperture 104 at the bend or corner thereof to provide for pivotally mounting of said holder 100 on a shaft 105 which extends transversely of the carriage 32 and is supported by the side walls 36 and 37. The free ends of said L-brackets 103 have attached thereto a tension spring 106 which is, in turn, secured to a suitable part of the bottom 40 of the carriage assembly, as as 107 (see FIGS. 6, 7 and 10.). Accordingly, the spring loading of the roller guard holder 100 serves to release said holder to an "open" and raised position of approximately 60° relative to the top surface of the carriage assembly 32 and up against an edge 108 of a removably attached housing or cover 109 (shown in broken lines in FIGS. 6, 7 and 10) after the said rails 99, 99 and the carriage assembly 32 have been driven beyond and clear of the drive wheels 26, 26. Inwardly of and immediately adjacent to the edge 108 of the machine housing or cover 109 and preferably carried by the front wall thereof, there is provided at least one static roller 110 which is disposed at a height so that it rollingly engages and acts to secure the ink roller guard and hold-down assembly 94 in its closed position during rearward travel of the carriage assembly 32 as it is manually moved toward the rear travel limit energizing microswitch 34. The roller 110 may be yieldably mounted as by a yieldable spring bracket 111 (best seen in FIG. 10 in broken outline) which may be manually adjusted to assure the proper pressure on the hold-down assembly 94.

In order to provide a uniform drive surface on top of the carriage for engagement with the drive rollers or wheels 26, 26, the back cover section 43 of the top wall 41 may be made of a thickness which equals that of the combined thicknesses of front section 44 and rails 99; or, on the other hand, a pair of static rails 112, 112 having the same thickness as rails 99, 99 may be fixed to back cover section 43 in alignment with hinged hold-down rails 99, 99.

It is to be understood that the carriage assembly 32, when fully assembled and mounted within the trackways 33, 33 is disposed with its top static rails 112, 112 and the hold-down rails 99, 99 in vertical alignment with and preferably only slightly below the drive rollers or wheels 26, 26 as they are held in their "raised" position. Similarly, the alignment of the ink roller 30 and ink roller guard plate 95 also coincide, with the ink roller 30, when in its "raised" position, preferably being only slightly raised above the surface of the ink roller guard plate 95 and the surface of the library recording slip or card 92 as the latter is positioned over the printing die characters and "framed" within the respective cut-out areas 96 and 97 of said guard plate 95.

It is to be further understood that the relative thickness of the roller guard plate 95, the guard holder 100 and that of the die characters is designed so as to assure that the die characters and overlying library recording slip or card are substantially on a level with the top surface of the roller guard plate 95 to assure positive printing when in assembled relationship; and, so as to permit the guard plate 95 and preferably the hold-down rails 99, 99 of the holder 100 to truly function as a means for holding down the library or charge-out slip 92 to keep it from slipping out of position during the printing operation.

Although the basic electrical circuitry has been shown diagrammatically in other figures, FIG. 8 is a further schematic wiring diagram which additionally shows an optional master safety switch 113 therein. The base member 1, U-frame 6 and carriage assembly 32 have been illustrated in broken outline in FIG. 8 to better relate the electrical components to the mechanical components. The operation of the electrical components will become more apparent from the following description of a complete cycle of operation.

The carriage assembly 32 in its forward position and up against the cut-off switch 35 has its ink roller guard and hold-down assembly 94 tilted upward at approximately 60° to its open position, with the card tray 45 fully exposed. The customer's or borrower's identification card 49 is then placed into the recess 48 of the card tray 45, with the printing die characters 50 upturned. The desired printing die date plate 67 carried on the movable date bar 61 is then properly indexed opposite the identification characters 50 by means of the control knob 83, detent means 87, gears 78, 84 and 75, and the date bar rack 74, the operation of this date bar setting means having been already described in operational detail. The book card or library charge-out slip 92 is then placed to overlie the said date and identification characters 69 and 50, respectively, and the ink roller guard and hold-down assembly 94 is then manually lowered into closed position against the pull of springs 106 to hold the identification and charge-out cards in place. The carriage assembly is then manually moved rearward beneath the printing head and the static roller 110 carried by the cover or housing 109, said roller 110 serving to retain the hold-down assembly 94 in its closed position during this operation. As the carriage assembly 32 strikes against and closes the energizing microswitch 34, said switch 34 simultaneously energizes the solenoid 16 and the drive motor 18 on the printing head, by way of the relay 36. Energization of the solenoid 16 causes the armature 16', which is pivotally attached to one arm 8 of the pivotally mounted U-frame 6, to be drawn downward by the electro-magnet coil of the solenoid, thus lowering the printing head by overcoming the spring 14 which normally holds the printing head in its predetermined raised position. As the arms of the U-frame 6 are rotated slightly downward about pivot shaft 5, the drive wheels 26, 26 and the ink-impregnated roller 30 engage with pressure upon rails 112, 112 and ink roller guard plate 95, respectively, of the carriage assembly 32, whereupon the energized motor imparts rotary driving action to said wheels 26, 26 thus driving said carriage assembly 32 forward. As the carriage assembly 32 is driven forward, it passes beneath the ink-impregnated roller 30, said roller 30 rolling under pressure over the "framed" areas of the library charge-out card to effect printing thereon of the desired data from the underlying embossed characters. The carriage assembly 32 is automatically driven forward until it strikes and opens the forward limiting microswitch 35, which, in turn, simultaneously de-energizes the drive motor 18 and the solenoid 16 through the relay 36. Following this, the spring 14 raises the printing head with its drive and printing rollers to their "raised" position while the springs 106, 106 raise the ink roller guard and hold-down assembly 94 to its "open" position, whereupon the charge-out card 93 and identification card 49 may be easily removed, and thus completing the cycle of operation. At this time, the machine is then ready to repeat the operation for the next borrower or customer.

Accordingly, an improved electrically driven library book charging machine has been attained according to the objects and advantages of the preamble of this specification, but it is to be understood that the machine is not limited to library use and can be adapted to other obvious applications and purposes.

While the specific details of one illustrative form of our invention have been shown and described, the invention is not confined thereto as various changes and alterations may be made without departing from the spirit thereof as defined in the appended claims.

We claim:

1. In a printing machine adapted to print from portable printing die members upon an overlying data recording member, the combination comprising a base, a printing head including inking means supported above said base for movement toward and away from printing position, a carriage having means for removably receiving and holding a printing die member and a data recording member in superimposed printing relation, said carriage being movably mounted on said base for shiftable movements in opposite directions beneath the printing head, said carriage being initially movable manually in one direction across said base to a pre-set position while the printing head is in a non-printing position, electro-mechanical power means responsive to attainment of the pre-set position aforesaid of the carriage for moving the printing head into printing position, and separate power means also responsive to pre-setting of the carriage for moving the carriage on said base in an opposite direction beneath and in cooperative printing relation to the printing head to complete a printing cycle.

2. A printing machine as defined in claim 1, wherein the inking means includes an ink-impregnated rotary platen, and means for normally yieldably urging the printing head away from printing position when the carriage reaches the limit of its movement in a direction opposite to the pre-setting movement of the carriage.

3. A printing machine as defined in claim 1, wherein both of said power means include inter-related electrical circuitry having control means disposed at opposite ends of the carriage travel for alternate engagement by said carriage.

4. A printing machine as defined in claim 1, wherein both of said power means include inter-related electrical circuitry having control means disposed at opposite ends of the carriage travel for alternate engagement by said carriage, said control means including switches, one of said switches being responsive to the initial movement of said carriage in one direction for activating the power positioning of the printing head and for substantially simultaneously energizing the power means for driving the carriage, and the other of said switches being responsive to power driven movement of the carriage in the opposite direction to its travel limit to substantially simultaneously deactivate the said respective power means.

5. A printing machine as defined in claim 1, wherein the printing head comprises a U-shaped support pivotally mounted on the base and the inking means includes an ink-impregnated impression roller rotatably mounted upon one arm of said U-shaped support, the power means for moving the carriage in said opposite directions also being mounted on said arm of said support, and wherein the means for moving the printing head into printing position is operatively connected to the other arm of said support.

6. A printing machine as defined in claim 1, wherein the means for receiving and holding the printing die member includes a removable tray, and said carriage further includes a separate printing die bar adjustably disposed adjacent to and cooperatively aligned with one edge of said tray for interlocking sliding engagement therewith.

7. A printing machine as defined in claim 1, wherein the means for receiving and holding the printing die member includes a removable tray, and said carriage further includes a separate printing die bar adjustably disposed adjacent one edge of said tray so that the printing characters of both printing members lie in a common plane, and indexing means for positioning the latter printing die bar in selective aligned positions with respect to the printing die member.

8. A printing machine as defined in claim 7, wherein said indexing means includes index controlling and locking means.

9. A printing machine as defined in claim 7, wherein said indexing means includes index controlling and locking means, a rack on said printing bar, a pinion gear interengaged with said rack and cooperatively interengaged with the controlling and locking means aforesaid.

10. A printing machine as defined in claim 1, wherein the inking means includes an ink-impregnated roller, and wherein the carriage includes combined hold-down and ink-roller guard means to removably and firmly hold the printing die plate and data recording members in superimposed position as well as to guard the data recording member from undesirable ink smears, respectively, during the printing operation, said latter means being movable to and from an operative position.

11. A printing machine as defined in claim 10, wherein said combined hold-down and ink-roller guard means includes a plate having an opening disposed to register with the printing die plate.

12. A printing machine as defined in claim 10, wherein a detachable cover is mounted on the base and houses the printing head, said cover having a hold-down roller disposed in cooperative engagement with the combined hold-down and ink-roller guard means on the carriage to maintain said latter means in operative position during the printing operation.

13. In a printing machine of the class described, the combination comprising a base, a printing head including inking means supported above said base for movement toward and away from a printing position, a carriage having means for removably receiving and holding a printing die member and a data recording member in superimposed printing relation, said carriage being movably mounted on said base for limited shiftable movements in opposite directions beneath the printing head, said carriage being initially manually movable to the travel limit in one direction to a pre-set position while the printing head is in a non-printing position, means for moving the printing head into printing position, and power means for moving the carriage in the other direction beneath and in cooperative printing relation to the printing head to complete a printing operation responsive to the aforesaid initial manual movement of the carriage.

14. A printing machine as defined in claim 13 wherein control means are disposed at opposite ends of the travel limits of the carriage, said control means at one end being operative to initially activate the said power moving means for the carriage, and the control means at the other end being operative to subsequently de-activate said power means at the completion of the printing run.

15. A printing machine as defined in claim 14, wherein the control means includes separate electrical switch means, and electrical circuit means cooperatively inter-relating the said switches to each other and to the power means.

16. In a printing machine of the class described, the combination comprising a base, a printing head including inking means supported above said base for movement toward and away from a printing position, a carriage having means for removably receiving and holding a printing die member and a data recording member in superimposed printing relation, said carriage being movably mounted on said base for limited shiftable movements in opposite directions beneath the printing head, said carriage being initially manually movable to the travel limit in one direction to a pre-set position while the printing head is in a non-printing position, power means for moving the printing head into printing position and for substantially simultaneously moving the carriage in the other direction beneath and in cooperative printing relation to the printing head to perform a printing operation, said power means being activated responsive to the aforesaid initial manual movement of the carriage to its travel limit.

17. A printing machine as defined in claim 16, wherein the power means includes electrically activated positioning means for the printing head carried on said base and operatively connected to the printing head, electrically activated drive means carried on said printing head and disposed for operative engagement with the carriage for power driving the latter, both of said electrically activated means having cooperatively inter-related circuitry and including control switches at opposite ends of carriage travel for alternate engagement by the carriage, one of said switches being in a normally open and inoperative position and adapted to be closed to an operative power-energizing position responsive to the initial manual movement of the carriage to its travel limit aforesaid.

18. In a printing machine of the class described, the combination comprising a base, a printing head including inking means supported above said base for movement toward and away from a printing position, a carriage having means for removably receiving and holding a printing die member and a data recording member in superimposed printing relation, said carriage being movably mounted on said base for limited shiftable movements in opposite directions beneath the printing head, said carriage being initially manually movable to the travel limit in one direction to a pre-set position while the printing head is in a non-printing position, power means for moving the printing head into printing position and for substantially simultaneously moving the carriage in the other direction beneath and in cooperative printing relation to the printing head, said power means including a first control means on the base at one end of the carriage travel for initially activating said latter power means responsive to the said initial manual movement of said carriage, and a second control means on the base at the opposite end of carriage travel responsive to movement of the power activated carriage in the opposite direction to de-activate the said power means at the completion of the printing operation.

References Cited in the file of this patent

UNITED STATES PATENTS

| | | |
|---|---|---|
| 351,618 | Bancroft | Oct. 26, 1886 |
| 1,228,425 | Freck | June 5, 1917 |
| 2,556,251 | Bell | June 12, 1951 |
| 2,620,730 | Gilbert | Dec. 9, 1952 |
| 2,694,975 | Garver | Nov. 23, 1954 |
| 2,797,614 | Marshall | July 2, 1957 |